United States Patent
Honma

[11] Patent Number: 5,991,914
[45] Date of Patent: Nov. 23, 1999

[54] CLOCK RECOVERY USING MAXIMUM LIKELIHOOD SEQUENCE ESTIMATION

[75] Inventor: Hiromi Honma, Tokyo, Japan

[73] Assignee: NEC Corporation, Japan

[21] Appl. No.: 08/801,570

[22] Filed: Feb. 18, 1997

[51] Int. Cl.[6] .......................... G06F 11/10; H03M 13/12
[52] U.S. Cl. ........................ 714/794; 714/795; 714/796
[58] Field of Search .................................. 714/794, 795, 714/796

[56] References Cited

U.S. PATENT DOCUMENTS

| | | | |
|---|---|---|---|
| 4,527,279 | 7/1985 | Yasuda et al. | 375/114 |
| 4,578,800 | 3/1986 | Yasuda et al. | 375/106 |
| 5,444,721 | 8/1995 | Okanoue et al. | 371/43 |
| 5,701,333 | 12/1997 | Okanoue et al. | 375/347 |
| 5,729,517 | 3/1998 | Fujiwara et al. | 369/59 |

*Primary Examiner*—Hoa T. Nguyen
*Attorney, Agent, or Firm*—Ostrolenk, Faber, Gerb & Soffen, LLP

[57] ABSTRACT

In a clock recovery circuit, an input data sequence is sampled in response to clock pulses produced by a voltage-controlled oscillator and data samples are produced. Branch metrics are produced to represent errors of the data samples from reference levels which the input data sequence assumes when the clock pulses are either advanced or delayed by a predetermined phase with respect to optimum timing of the input data sequence. Corresponding to transition states which the branch metrics assume when the clock pulses are advanced by the predetermined phase, a first set of path metrics is produced and corresponding to transition states which the branch metrics assume when the clock pulses are delayed by the predetermined phase, a second set of path metrics is produced. First and second minimum path metrics are selected from the first and second sets of path metrics, respectively, and a differential minimum path metric representative of the difference between the first and second minimum path metrics is produced. Successive differential minimum path metrics are integrated and the V.C.O. is controlled with the integrated path metrics.

20 Claims, 6 Drawing Sheets

CLOCK RECOVERY USING MAXIMUM LIKELIHOOD SEQUENCE ESTIMATION

BACKGROUND OF THE INVENTION

1. Field of the Invention

The present invention relates to extraction of clock information which is particularly suitable for recovering clock pulses from signals corrupted by noisy channels such as high density recording mediums.

2. Description of the Related Art

With continued advances in high density recording technology, there is a need to recover data signals from noisy channels with as low a bit error rate as possible. Partial response maximum likelihood sequence estimation, which has been used in communication systems, is currently under study as a new technology for detecting signals from high density recording mediums. However, the clock frequency spectrum of the signals has no sufficient signal-to-noise ratio for properly operating a conventional phase-locked loop and sampling jitter results. Although partial response maximum likelihood sequence estimation is theoretically powerful for recovering data from high density discs, its performance will be limited if the recovered clock is affected with jitter.

Accordingly, there exists a need for recovering jitter-free clock information from distorted signals.

SUMMARY OF THE INVENTION

It is therefore an object of the present invention to provide a clock recovery circuit and method capable of recovering sufficient clock information from distorted signals.

According to one aspect of the present invention, the clock recovery circuit comprises means for sampling an input data sequence in response to clock pulses produced by a variable frequency oscillator and producing therefrom data samples. A maximum likelihood sequence estimation circuit is responsive to the data samples for producing a plurality of branch metrics representing errors of the data samples from reference levels which the input data sequence assumes when the clock pulses are either advanced or delayed by a predetermined phase with respect to optimum timing of the input data sequence, and producing a first minimum path metric representing a minimum sum of branch metrics that occur in a first sequence and a second minimum path metric representing a minimum sum of branch metrics that occur in a second sequence. From the first and second minimum path metrics a differential minimum path metric is produced. An integrator is provided for integrating successive differential minimum path metrics and controlling the variable frequency oscillator with the integrated path metrics.

The maximum likelihood sequence estimation circuit comprises a branch metric calculator for producing the branch metrics from the data samples, a first ACS (add/compare/select) circuit responsive to the branch metrics for producing a plurality of path metrics corresponding respectively to transition phase states which the branch metrics assume when the clock pulses are advanced by the predetermined phase, a second ACS circuit responsive to the branch metrics for producing a plurality of path metrics corresponding respectively to transition phase states which the branch metrics assume when the clock pulses are delayed by the predetermined phase, a first minimum selector for selecting the first minimum path metric from the path metrics produced by the first ACS circuit and supplying the selected path metric to the subtractor, and a second minimum selector for selecting the second minimum path metric from the path metrics produced by the second ACS circuit and supplying the selected path metric to the subtractor.

According to a second aspect, the present invention provides a clock recovery method comprising the steps of:

a) sampling an input data sequence in response to clock pulses produced by a variable frequency oscillator and producing therefrom data samples;

b) producing from the data samples a plurality of branch metrics respectively representing errors of the data samples from reference levels which the input data sequence assumes when the clock pulses are either advanced or delayed by a predetermined phase from optimum timing of the input data sequence;

c) producing a first minimum path metric representing a minimum sum of the branch metrics when the branch metrics occur in a first sequence and a second minimum path metric representing a minimum sum of the branch metrics when the branch metrics occur in a second sequence;

d) producing a differential minimum path metric representing the difference between the first and second minimum path metrics; and e) integrating differential minimum path metrics successively produced by step (d) and controlling the variable frequency oscillator with the integrated path metrics.

BRIEF DESCRIPTION OF THE DRAWINGS

The present invention will be described in further detail with reference to the accompanying drawings, in which.

DETAILED DESCRIPTION

Figure 1:
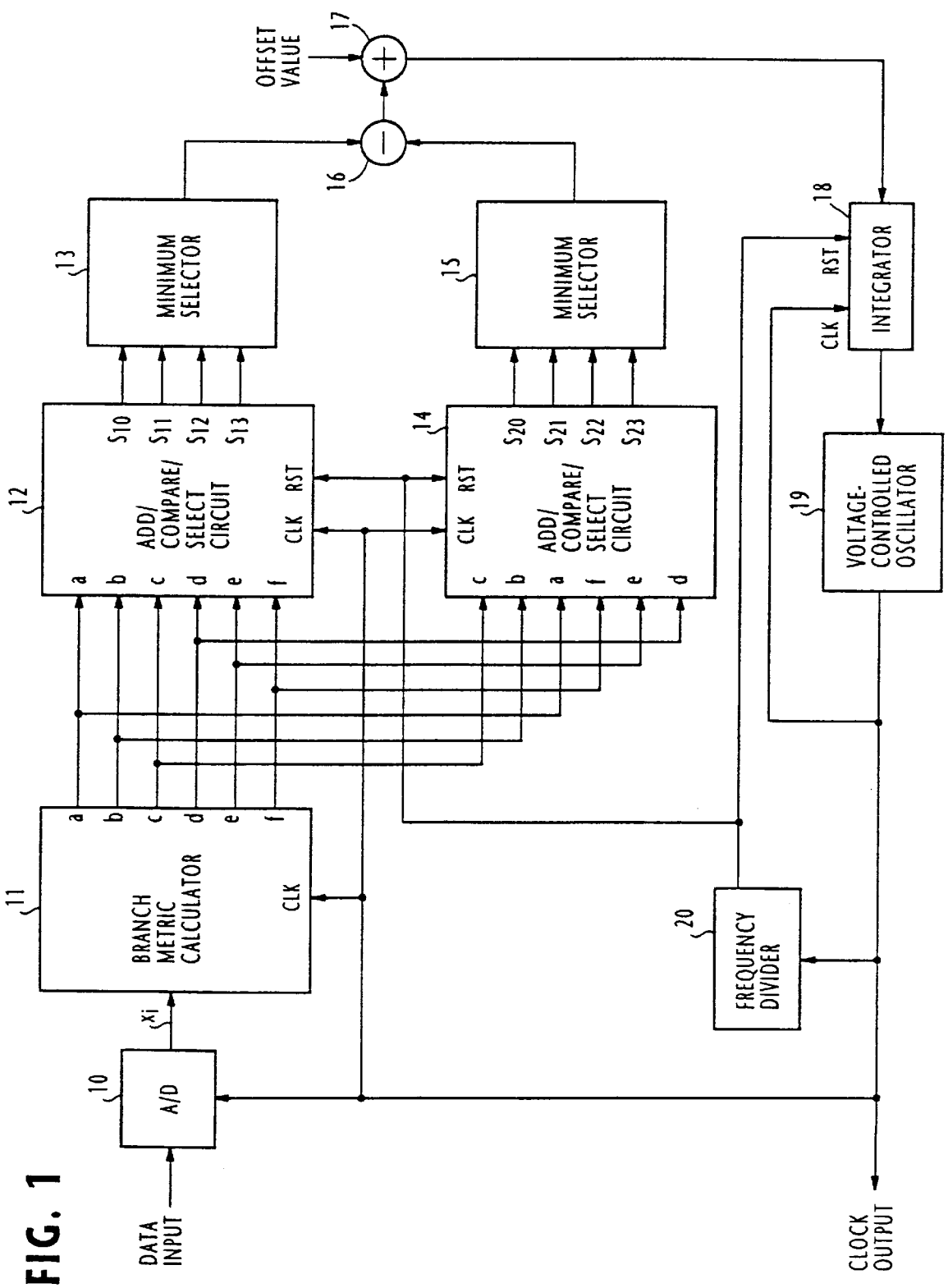
FIG. 1 is a block diagram of a clock recovery circuit according to one embodiment of the present invention.

In FIG. 1, there is shown a clock recovery circuit according to one embodiment of the present invention which is characterized by the use of a partial response maximum likelihood sequence estimation technique for controlling a voltage-controlled oscillator 19 to produce clock pulses in a phase-locked loop. A frequency divider 20 is connected to the output of V.C.O 19 to produce reset pulses. As will be understood, the VCO clock pulses correspond to the timing for producing branch metrics and the reset pulses correspond to the timing for producing path metrics.

In the present invention, the source signal is originally encoded according to a particular channel (line) coding technique such as duobinary coding for partial response signaling. The encoded signal is either transmitted via transmission link or recorded into a recording medium and then recovered. In either case, the signal can be treated as if it were passed through an additive white Gaussian noise (AGWN) channel and were corrupted by intersymbol interference.

For the purpose of disclosure, it is assumed that the original signal is encoded with (1,7) RLL (run length limited) codes so that there is no consecutive occurrence of symbols 0 and recorded on an optical disc in the NRZI (nonreturn-to-zero inverted) format. Although the clock recovery circuit of this invention is particularly suitable for partial response signaling, it could also be used for other channel coding formats.

In a recovery circuit, the recorded signal is read out from the recording medium and then partial-response equalized. The equalized signal is applied to an analog-to-digital converter 10. If the equalization process is implemented with an analog circuit, it is connected to the input of the A/D converter 10, and if implemented with a digital circuit, it is connected to the output of the A/D converter.

The input signal of the A/D converter 10 is sampled at periodic intervals in response to a clock pulse from the V.C.O. 19 and the amplitude of the sample is converted to a digital sample $x_j$. Due to the duobinary channel coding, the clock phase of digital sample $x_j$ has three levels (+1, 0, −1) when the clock timing is optimum and six levels (+1, +β, +α, −α, −β, −1) otherwise, and assumes one of four phase states ($S_0$, $S_1$, $S_2$, $S_3$).

Figure 2A:
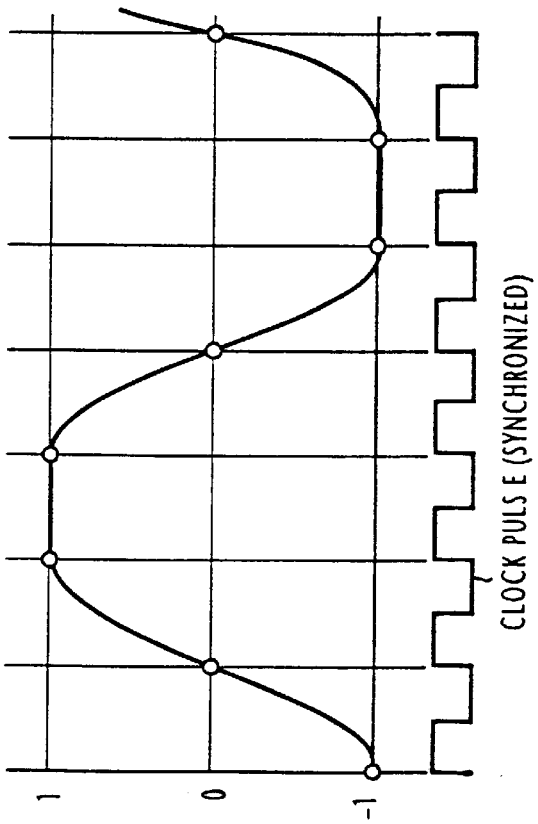
FIG. 2A is a graphic representation of an input data sequence when it is sampled at optimum timing.
Figure 2B:
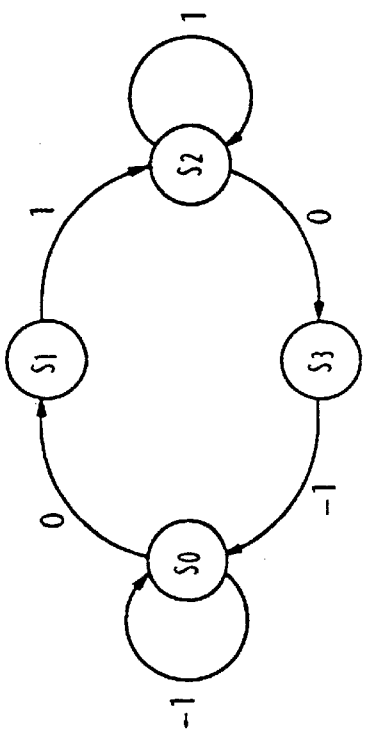
FIG. 2B is a state transition diagram of the clock recovery circuit when the input sequence is sampled at optimum timing.

When V.C.O. 19 is synchronized to the clock timing of an input data sequence as shown in FIG. 2A, the A/D converter 10 recognizes that the data sequence has one of three levels +1, 0, −1 at the leading edge of the clock pulse as marked by circles and the phase of the data sequence changes states in clockwise direction as shown in FIG. 2B. For example, when the data sequence has amplitude −1, the phase enters into state $S_0$ which continues as long as the data sequence has amplitude −1. The phase changes from state $S_0$ to $S_1$ in response to the data sequence having amplitude 0 and changes to state $S_2$ when the amplitude changes from 0 to 1. State $S_2$ continues as long as the amplitude is maintained at 1. The phase changes from $S_2$ to S3when the amplitude varies from 1 to 0 and returns to S0 in response to amplitude −1.

Figure 3A:
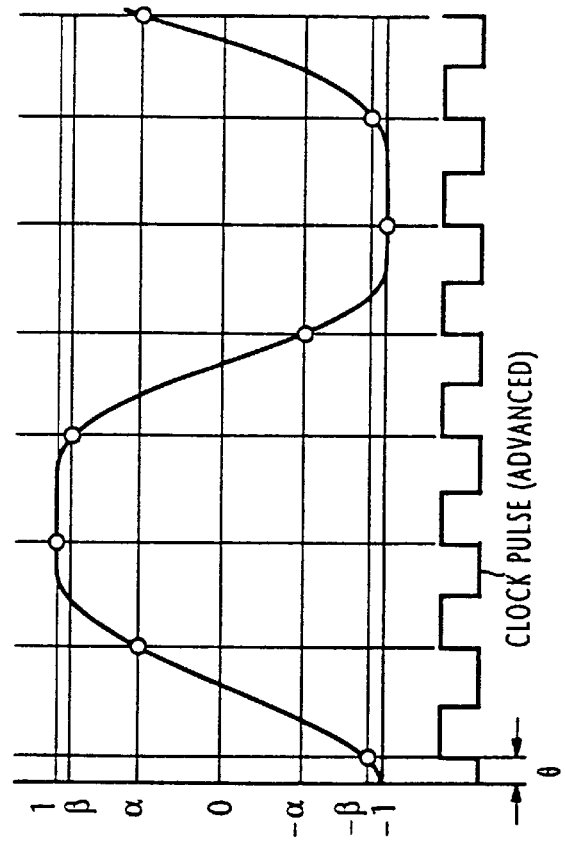
FIG. 3A is a graphic representation of an input data sequence when it is sampled at advanced timing.
Figure 3B:
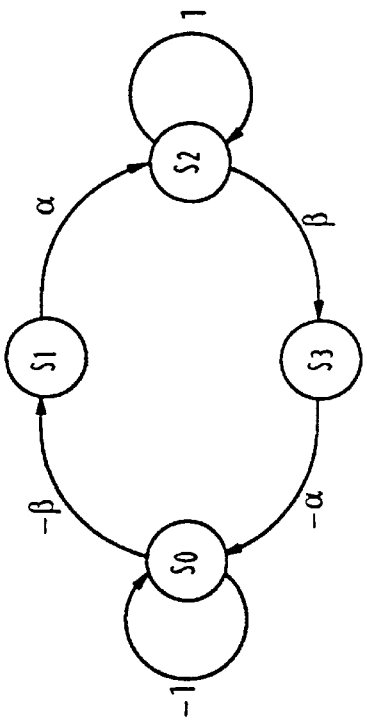
FIG. 3B is a state transition diagram of the clock recovery circuit when the input sequence is sampled at the advanced timing.

When V.C.O. 19 is advanced by θ with respect to the input clock timing as shown in FIG. 3A, the A/D converter 10 recognizes that the data sequence has one of six levels +1, +β, +α, −α, −β, −1 at the leading edge of the clock pulse as marked by circles and the phase of the data sequence changes states in clockwise direction as shown in FIG. 3B. For example, when the data sequence has amplitude −β, the phase enters into state $S_1$ and changes to $S_2$ in response to amplitude +α which state continues as long as the data sequence has amplitude +1. The phase changes from state $S_2$ to $S_3$ in response to amplitude +β and changes to state $S_0$ when the amplitude changes from +β to −α. State $S_0$ continues as long as the amplitude is maintained at −1.

Figure 4A:
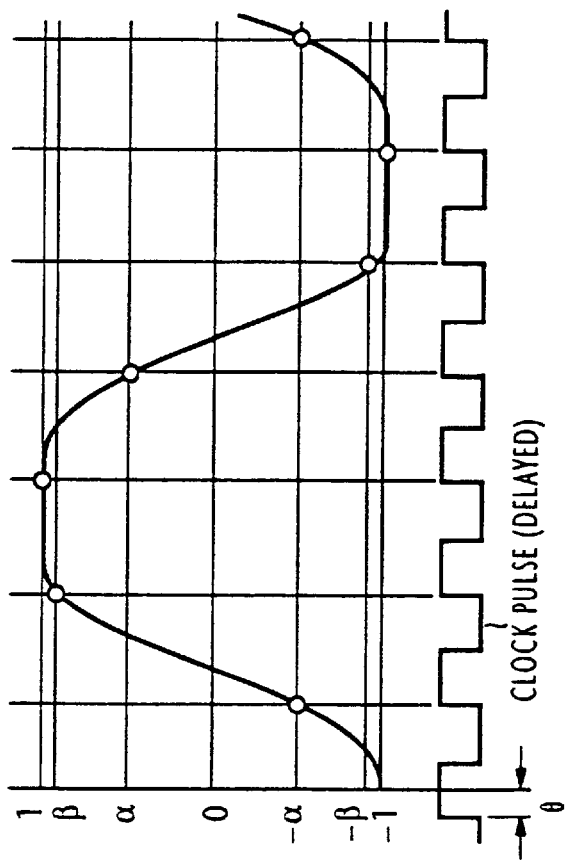
FIG. 4A is a graphic representation of an input data sequence when it is sampled at delayed timing.
Figure 4B:
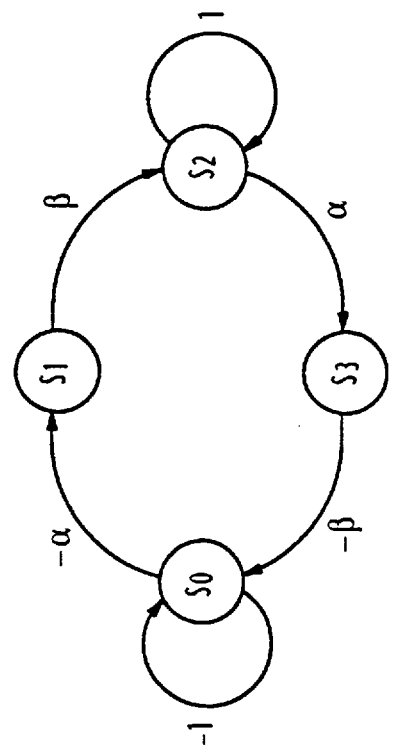
FIG. 4B is a state transition diagram of the clock recovery circuit when the input sequence is sampled at the delayed timing.

When V.C.O. 19 is delayed by θ with respect to the input clock timing as shown in FIG. 4A, the A/D converter 10 recognizes that the data sequence has one of six levels +1, +β, +α, −α, −β, −1 at the leading edge of the clock pulse as marked by circles as in the case of advanced timing and the phase of the data sequence changes states in clockwise direction as shown in FIG. 4B. For example, when the data sequence has amplitude −α, the phase enters into state $S_1$ and changes to $S_2$ in response to amplitude +β which state continues as long as the data sequence has amplitude +1. The phase changes from state $S_2$ to state $S_3$ in response to amplitude +α and changes to state $S_0$ when the amplitude changes from +α to −β. State $S_0$ continues as long as the amplitude is maintained at −1.

A branch metric calculator 11 is connected to the output of the A/D converter 10 to provide maximum-likelihood sequence estimation on the input digital signal using the Viterbi decoding algorithm.

Under additive white Gaussian noise the probability of distribution of a data sample is represented by a sum of a plurality of different Gaussian distributions. If the lth level has a distribution where its center is located at $a_i$ with the variance of the center being equal to $\sigma^2$, then the probability $P_i(x)$ of the input data sample "x" assuming the level $a_i$ is given by:

$$P_i(x) = exp[-(x-a_i)^2/2\sigma^2]/\sqrt{2\pi\sigma^2} \quad (1)$$

Since the probability Q of the input data sample $x_j$ assuming the $m_j$th level is expressed by Equation (2) as follows, $$Q = \ldots \cdot Pm_{j-1}(x_{j-1}) \cdot Pm_j(x_j) \cdot Pm_{j+1}(x_{j+1}) \quad (2)$$

taking the logarithm of both sides of Equation (2) to find a maximum probability Q yields the following equation:

$$\log Q = \sum \log [P_{m_j}(x_j)] \quad (3)$$
$$= \sum \log\{1/\sqrt{2\pi\sigma^2}\} - \sum\{(x_j - a_{m_j})^2/2\sigma^2\}$$

Since the Q value is at maximum if the second term of Equation (3) is minimum, a maximum Q value is found by finding a minimum path metric $M_n$ (or squared error sum);

$$M_n = \sum_{j=1}^{n}(x_j - a_{mj})^2 \quad (4)$$

where $(x_j - a_{mj})^2$ represents a squared error of data sample $x_j$ with respect to the reference levels and is called the jth branch metric.

The branch metric calculator 11 determines squared errors of data samples $x_j$ from expected reference levels +1, +β, +α, −α, −β, −1 which the input data sequence assumes if it is sampled at timing offset in either direction by a predetermined phase (preferably, 90 degrees) with respect to the optimum timing of the input data sequence and produces a set of six branch metrics at intervals of the clock pulses from V.C.O. 19. Thus, at each jth clock pulse, the following six branch metrics are produced by the branch metric calculator 11:

$a = (x_j + \alpha)^2$
$b = (x_j + 1)^2$
$c = (x_j + \beta)^2$
$d = (x_j - \alpha)^2$
$c = (x_j - 1)^2$
$f = (x_j - \beta)^2$ These branch metrics are applied to add/compare/select circuits 12 and 14.

Responsive to the six branch metrics, the ACS circuit 12 produces four minimum path metrics corresponding respectively to transition phase states which the branch metrics would assume when the input data sequence is sampled at timing advanced by the predetermined phase with respect to the optimum timing, and the ACS circuit 14 produces four minimum path metrics corresponding respectively to transition phase states which the branch metrics would assume when the input data sequence is sampled at timing delayed by the predetermined phase with respect to the optimum timing.

More specifically, when the V.C.O. clock timing is advanced by 90 degrees with respect to the optimum timing of the input data sequence, branch metrics occur in sequence of $\alpha$, 1, $\beta$, $-\alpha$, $-1$ and $-\beta$, and when the V.C.O. clock timing is delayed by 90 degrees with respect to the optimum timing, the branch metrics occur in sequence of $\beta$, 1, $\alpha$, $-\beta$, $-1$ and $-\alpha$.

The ACS circuit 12 produces the following path metrics $M_n(S_0)$, $M_n(S_1)$, $M_n(S_2)$ and $M_n(S_3)$ corresponding respectively to phase states $S_0$, $S_1$, $S_2$ and $S_3$ according to the following recurrence equations:

$$M_n(S_0) = min[M_{n-1}(S_3) + a, M_{n-1}(S_0) + b] \tag{5a}$$

$$M_n(S_1) = M_{n-1}(S_0) + c \tag{5b}$$

$$M_n(S_2) = min[M_{n-1}(S_1) + d, M_{n-1}(S_2) + e] \tag{5c}$$

$$M_n(S_3) = M_{n-1}(S_2) + f \tag{5d}$$

Similarly, the ACS circuit 14 produces the following path metrics $M_n(S_0)$, $M_n(S_1)$, $M_n(S_2)$ and $M_n(S_3)$ at intervals of "n" clock pulses:

$$M_n(S_0) = min[M_{n-1}(S_3) + c, M_{n-1}(S_0) + b] \tag{6a}$$

$$M_n(S_1) = M_{n-1}(S_0) + a \tag{6b}$$

$$M_n(S_2) = min[M_{n-1}(S_1) + f, M_{n-1}(S_2) + e] \tag{6c}$$

$$M_n(S_3) = M_{n-1}(S_2) + d \tag{6d}$$

Figure 5:
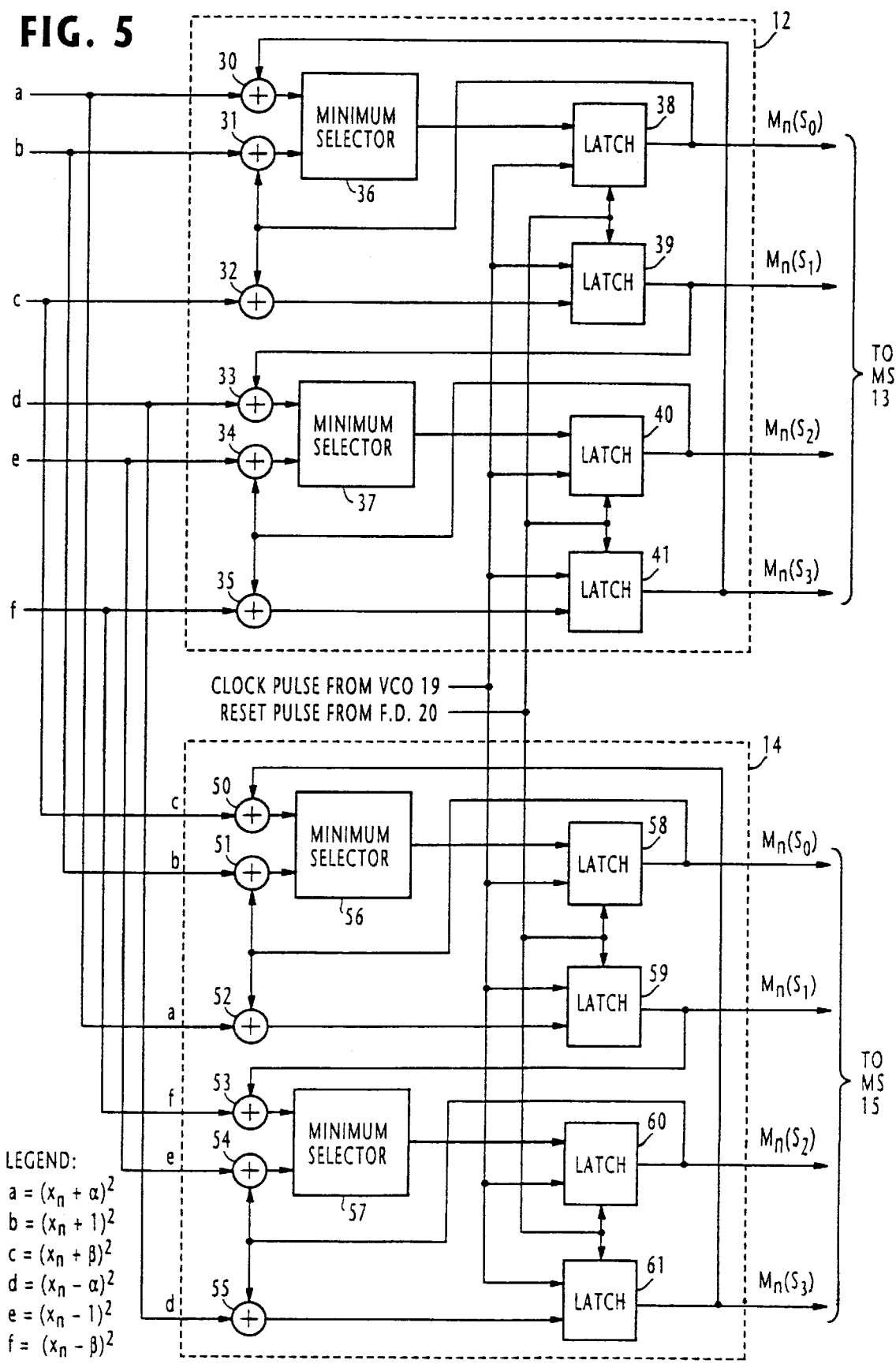
FIG. 5 is a block diagram of the first and second ACS circuits of FIG. 1.

As shown in detail in FIG. 5, the ACS circuit 12 comprises adders 30 through 35, minimum selectors 36, 37 and latches 38 through 41. Each of the latches is clocked by the output of V.C.O. 19 and cleared by the reset pulse from frequency divider 20 at periodic intervals, producing a minimum path metric. In response to the clock pulse from V.C.O. 19, latches 38 and 40 store the outputs of minimum selectors 36 and 37, respectively, while latches 39 and 41 store the outputs of adders 32 and 35. The content of each of these latches is a sum of previous branch metrics that precede the branch metric currently supplied to each of the adders.

Adder 30 produces the first input signal of minimum selector 36 by summing the branch metric "a" and the path metric $M_n(S_3)$ from latch 41 and adder 31 produces the second input signal of the minimum selector 36 by summing the branch metric "b" and the path metric $M_n(S_0)$ from latch 38. Adder 32 produces the input signal of latch 39 by summing the branch metric "c" and the path metric $M_n(S_0)$ from latch 38. In a similar manner, adder 33 produces the first input signal of minimum selector 37 by summing the branch metric "d" and the path metric $S_{11}$ from latch 39 and adder 34 produces the second input signal of the minimum selector 37 by summing the branch metric "e" and the path metric $M_n(S_2)$ from latch 40. Adder 35 produces the input signal of latch 41 by summing the branch metric "f" and the path metric $M_n(S_2)$ from latch 40. Minimum selector 36 compares the outputs of adders 30 and 31 and selects the smaller of the two and stores it into latch 38 as the path metric $M_m(S_0)$, and minimum selector 37 compares the first and second input signals from adders 33 and 34 and selects the smaller of the two and feeds the latch 40.

In the ACS circuit 14, on the other hand, adder 50 produces the first input signal of minimum selector 56 by summing branch metric "c" and path metric $M_n(S_3)$ from latch 61 and adder 51 produces the second input signal of the minimum selector 56 by summing branch metric "b" and path metric $M_n(S_0)$ from latch 58. Adder 52 produces the input signal of latch 59 by summing branch metric "a" and path metric $M_n(S_0)$ from latch 58. Adder 53 produces the first input signal of minimum selector 57 by summing branch metric "f" and path metric $M_n(S_1)$ from latch 59 and adder 54 produces the second input signal of minimum selector 57 by summing branch metric "e" and path metric $M_n(S_2)$ from latch 60. Adder 55 produces the input signal of latch 61 by summing branch metric "d" and path metric $M_n(S_2)$ from latch 60.

The clock-synchronous add, compare and select operations continue until all the latches are cleared periodically by a reset pulse from the frequency divider 20, and the same operations are repeated during the subsequent reset intervals.

Figure 6:
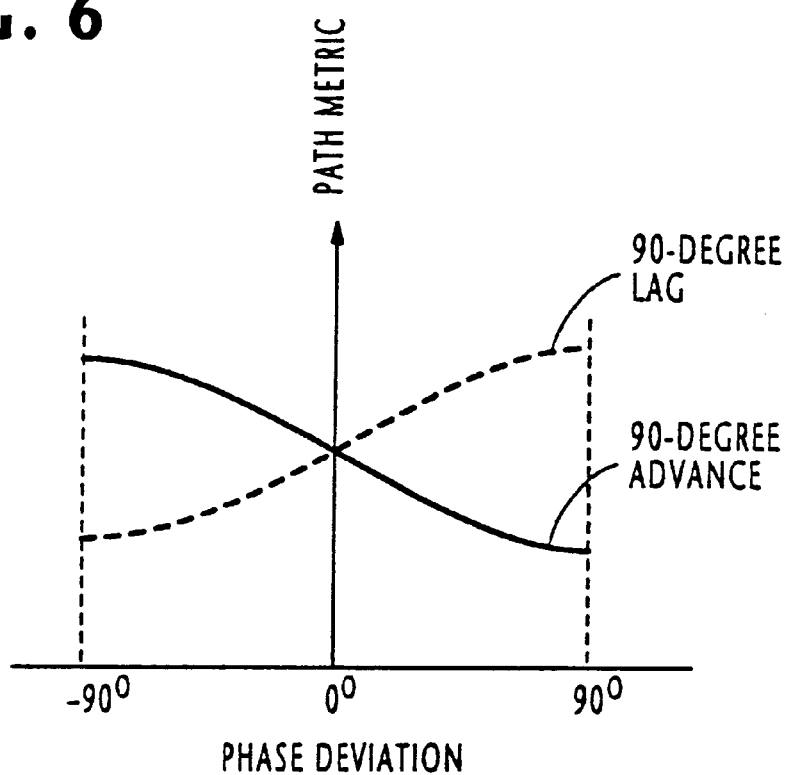
FIG. 6 is a graphic representation of path metrics produced by the ACS circuits.

As shown in FIG. 6, when the sampling instant is advanced by 90 degrees with respect to the correct timing of the input data sequence, one of the path metrics of ACS circuit 12 has a minimum level as indicated by a solid-line curve and one of the path metrics of ACS circuit 14 has a maximum level as indicated by a dotted-line curve. Conversely, when the sampling instant is delayed by 90 degrees with respect to that correct timing, one of the path metrics of ACS circuit 12 has a maximum level while one of the path metrics of ACS circuit 14 has a minimum level.

Figure 7:
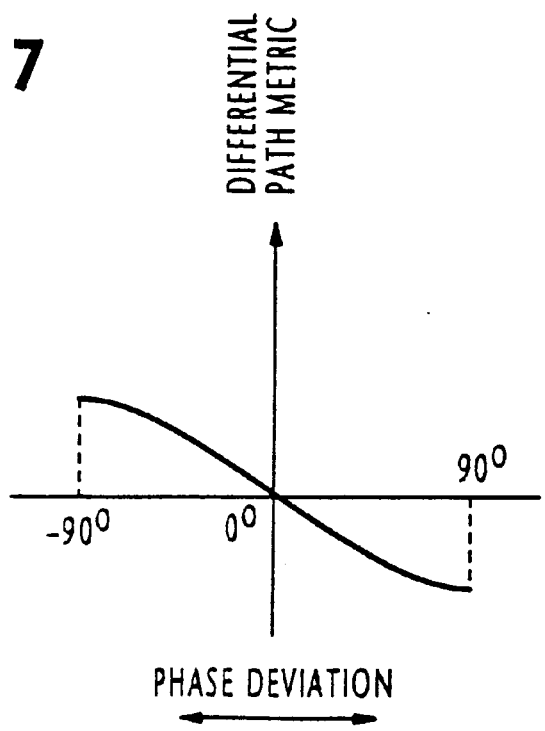
FIG. 7 is a graphic representation of a differential path metric produced by the subtractor of FIG. 1.

Returning to FIG. 1, the path metrics produced by ACS circuits 12 and 14 are supplied to minimum selectors 13 and 15, respectively. Since the maximum likelihood sequence estimation is a process of finding a path having a least value of squared error sum as given by Equation (4), the selectors 13 and 15 are the final stage of this process by detecting minimum path metrics from the outputs of the corresponding ACS circuits. The minimum path metrics detected by selectors 13 and 15 are fed to a subtractor 16 to produce a differential path metric. As shown in FIG. 7, this differential path metric varies in a range between a maximum positive value and a maximum negative value corresponding respectively to 90-degree phase delay and 90-degree phase advance. It is seen that when the V.C.O. clock timing is synchronized to the input data sequence, the output of subtractor 16 is substantially reduced to zero.

If the input data sample is derived from a recording medium, it is preferable to add an offset value to the differential path metric by using an adder 17. The summing of this offset value to the differential path metric has the effect of compensating for the nonlinear characteristics of the recording system, i.e., the recording medium used and the associated recording circuitry.

The output of adder 17 is connected to a resettable integrator 18 which is clocked by the output of V.C.O. 19 and cleared by the reset pulse from frequency divider 20. Thus, differential path metrics which are produced during the interval between successive reset pulses are integrated. Using the output of integrator 18 as a feedback signal, the V.C.O. 19 is controlled in a phase-locked loop.

Figure 8:
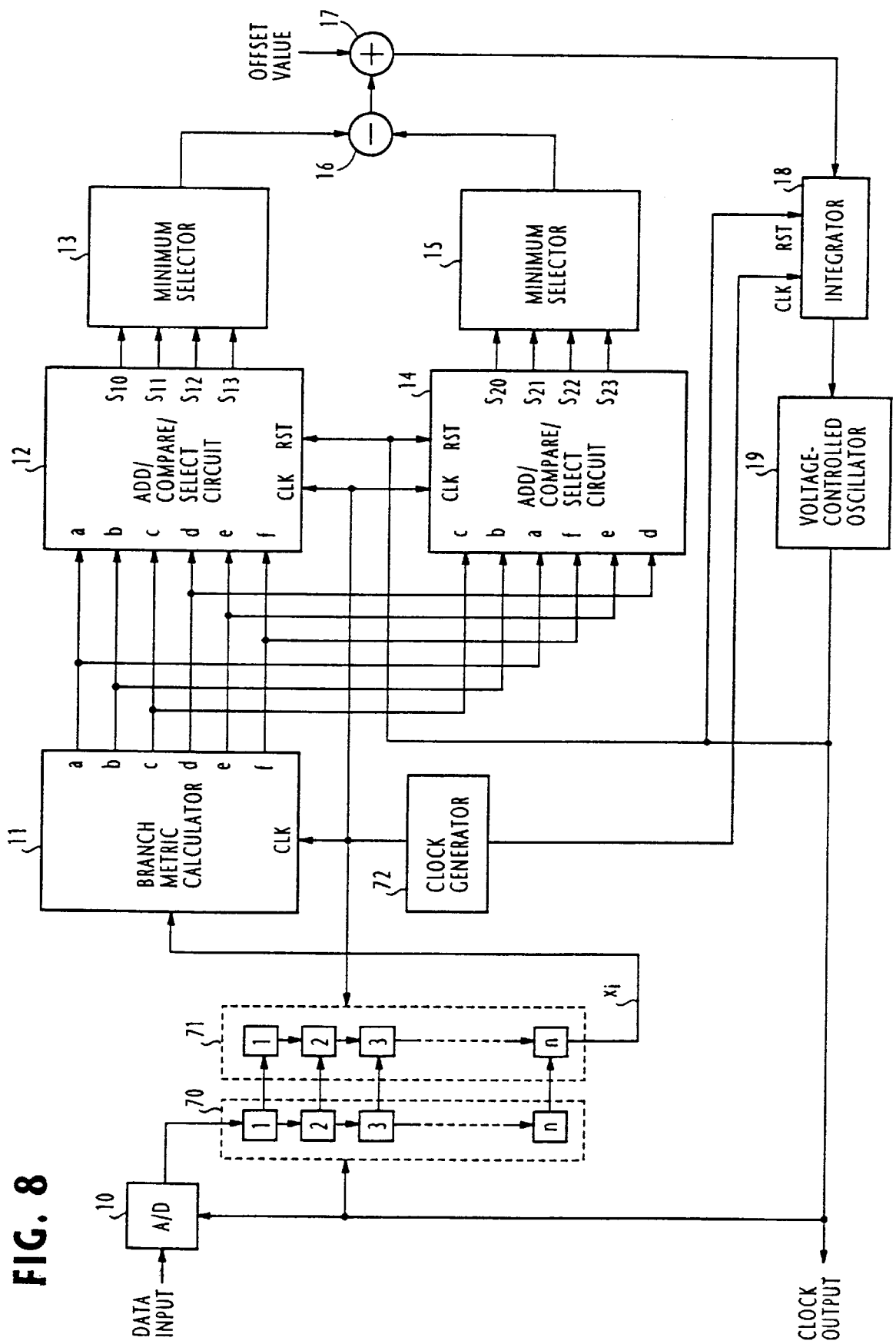
FIG. 8 is a block diagram of a clock recovery circuit according to a second embodiment of the present invention.

A modified embodiment of the present invention is shown in FIG. 8, which is suitable for high-speed phase tracking operation. This modification additionally includes a first shift register 70 and a second shift register 71, each shift register having the same number of multibit stages 1 through n. The first shirt register 70 is connected to the output of A/D converter 10 to sequentially store digital samples. The respective stages of shift register 70 are connected to corresponding stages of shift register 71 which are connected in series to the input of branch metric calculator 11. Shift register 70 is clocked by the output of V.C.O. 19 to serially store successive data samples $x_1, \ldots, x_{1-n}$ from A/D converter 10. The data samples stored in the first shift register 70 are then shifted to subsequent stages and at the same time to the corresponding states of the second shift register 71. The data samples stored in the second shift register 71 are sequentially shifted out into the branch metric calculator 11 in response to clock pulses supplied from a clock generator 72 at a frequency n times higher than the output frequency of the V.C.O. 19. Therefore, during an ith V.C.O. clock interval, data samples $x_i, \ldots, x_{i-n}$ are sequentially supplied from shift register 71 to the branch metric calculator 11. The ACS circuits 12 and 14 are clocked by the output of clock generator 72 to produce "n" sets of four path metrics in response to each clock pulse from the clock generator 72 using the recurrence equations described above and cleared by the output of V.C.O. 19. Integrator 18 of this embodiment is clocked by the clock generator 72 and cleared by the output of V.C.O. 19.

What is claimed is:

1. A clock recovery circuit comprising:

means for sampling an input data sequence in response to clock pulses and producing therefrom data samples;

a maximum likelihood sequence estimation circuit responsive to said data samples for producing a plurality of branch metrics representing errors of said data samples from reference levels which said input data sequence assumes when the clock pulses are either advanced or delayed by a predetermined phase with respect to optimum timing of said input data sequence, and producing a first minimum path metric representing a minimum sum of ones of said branch metrics which occur when said clock pulses are advanced by said predetermined phase and a second minimum path metric representing a minimum sum of ones of said branch metrics which occur when said clock pulses are delayed by said predetermined phase;

a subtractor for producing a differential minimum path metric representing the difference between said first and second minimum path metrics;

an integrator for integrating differential minimum path metric representing the difference between said first and second minimum path metrics;

an integrator for integrating differential minimum path metrics successively produced by the subtractor; and a variable frequency oscillator responsive to an output signal from the integrator for producing said clock pulses.

2. A clock recovery circuit as claimed in claim 1, wherein said predetermined phase is 90 degrees.

3. A clock recovery circuit as claimed in claim 1, wherein said sampling means comprises an analog to digital converter for converting said input data sequence into digital data samples in response to said clock pulses.

4. A clock recovery circuit as claimed in claim 1, wherein said input data sequence is in a partial response signaling format.

5. A clock recovery circuit comprising:

means for sampling an input data sequence in response to clock pulses and producing therefrom data samples;

a maximum likelihood sequence estimation circuit responsive to said data samples for producing a plurality of branch metrics representing errors of said data samples from reference levels which said input data sequence assumes when the clock pulses are either advanced or delayed by a predetermined phase with respect to optimum timing of said input data sequence, and producing a first minimum path metric representing a minimum sum of branch metrics which occur in a first sequence and a second minimum path metric representing a minimum sum of branch metrics which occur in a second sequence;

a subtractor for producing a differential minimum path metric representing the difference between said first and second minimum path metrics;

an integrator for integrating differential minimum path metrics successively produced by the subtractor; and a variable frequency oscillator responsive to an output signal from the integrator for producing said clock pulses;

and further wherein said maximum likelihood sequence estimation circuit comprises:

a branch metric calculator for producing said plurality of branch metrics from said data samples;

a first ACS (add/compare/select) circuit responsive to said branch metrics for producing a first plurality of path metrics corresponding respectively to transition phase states which said branch metrics assume when the clock pulses are advanced by said predetermined phase;

a second ACS circuit responsive to said branch metrics for producing a second plurality of path metrics corresponding respectively to transition phase states which said branch metrics assume when the clock pulses are delayed by said predetermined phase;

a first minimum selector for selecting said first minimum path metric from said first plurality of path metrics and supplying the selected path metric to said subtractor; and a second minimum selector for selecting said second minimum path metric from said second plurality of path metrics and supplying the selected path metric to said subtractor.

6. A clock recovery circuit as claimed in claim 5, wherein said first ACS circuit comprises:

a plurality of adders for respectively receiving branch metrics that occur in said first sequence from the branch metric calculator;

a plurality of minimum selectors each for selecting a minimum value of outputs from a first group of the adders; and a plurality of latches corresponding respectively to said transition phase states for storing output signals from the minimum selectors and a second group of the adders and supplying the stored signals to said adders to produce said first plurality of path metrics, wherein said second ACS circuit comprises:

a plurality of adders for respectively receiving branch metrics that occur in said second sequence from the branch metric calculator;

a plurality of minimum selectors each for selecting a minimum value of outputs from a first group of the adders; and a plurality of latches corresponding respectively to said transition phase states for storing output signals from the minimum selectors and a second group of the adders to produce said second plurality of path metrics.

7. A clock recovery circuit as claimed in claim 5, further comprising means for clearing said first and second ACS circuits at a rate lower than a rate at which said clock pulses are produced.

8. A clock recovery circuit as claimed in claim 7, wherein said clearing means is arranged to clear said first and second ACS circuits when a predetermined number of path metrics are produced by each of said first and second ACS circuits.

9. A clock recovery circuit as claimed in claim 7, wherein said clearing means comprises a frequency divider responsive to the clock pulses produced by said variable frequency oscillator for supplying reset pulses to said first and second ACS circuits at a rate lower than the rate of said clock pulses.

10. A clock recovery circuit as claimed in claim 5, wherein said sampling means further comprises:
   a first shift register for storing data samples successively produced by the sampling means; and
   a second shift register for simultaneously storing the data samples from the first shift register into a second shift register and sequentially reading the stored data samples from the second shift register into said branch metric calculator at a rate higher than a rate at which said data samples are produced.

11. A clock recovery circuit as claimed in claim 10, wherein said first and second ACS circuits are cleared in response to the clock pulses produced by said variable frequency oscillator.

12. A clock recovery circuit as claimed in claim 10, wherein said integrator is cleared in response to the clock pulses produced by said variable frequency oscillator.

13. A clock recovery circuit comprising:
   means for sampling an input data sequence in response to clock pulses and producing therefrom data samples;
   a maximum likelihood sequence estimation circuit responsive to said data samples for producing a plurality of branch metrics representing errors of said data samples from reference levels which said input data sequence assumes when the clock pulses are either advanced or delayed by a predetermined phase with respect to optimum timing of said input data sequence, and producing a first minimum path metric representing a minimum sum of branch metrics which occur in a first sequence and a second minimum path metric representing a minimum sum of branch metrics which occur in a second sequence;
   a subtractor for producing a differential minimum path metric representing the difference between said first and second minimum path metrics;
   an integrator for integrating differential minimum path metrics successively produced by the subtractor; and
   a variable frequency oscillator responsive to an output signal from the integrator for producing said clock pulses;
   and further comprising means for adding an offset value to said differential minimum path metric for compensating for a nonlinear characteristic of said input data sequence.

14. A clock recovery circuit comprising:
   means for sampling an input data sequence in response to clock pulses and producing therefrom data samples;
   a maximum likelihood sequence estimation circuit responsive to said data samples for producing a plurality of branch metrics representing errors of said data samples from reference levels which said input data sequence assumes when the clock pulses are either advanced or delayed by a predetermined phase with respect to optimum timing of said input data sequence, and producing a first minimum path metric representing a minimum sum of branch metrics which occur in a first sequence and a second minimum path metric representing a minimum sum of branch metrics which occur in a second sequence;
   a subtractor for producing a differential minimum path metric representing the difference between said first and second minimum path metrics;
   an integrator for integrating differential minimum path metrics successively produced by the subtractor; and
   a variable frequency oscillator responsive to an output signal from the integrator for producing said clock pulses;
   and further wherein said integrator is cleared when a predetermined number of differential minimum path metrics are integrated.

15. A clock recovery method comprising the steps of:
   a) sampling an input data sequence in response to clock pulses produced by a variable frequency oscillator and producing therefrom data samples;
   b) producing from said data samples a plurality of branch metrics respectively representing errors of said data samples from reference levels which said input data sequence assumes when the clock pulses are either advanced or delayed by a predetermined phase from optimum timing of the input data sequence;
   c) producing a first minimum path metric representing a minimum sum of ones of said branch metrics which occur when said clock pulses are advanced by said predetermined phase and a second minimum path metric representing a minimum sum of ones of said branch metrics which occur when said clock pulses are delayed by said predetermined phase;
   d) producing a differential minimum path metric representing the difference between said first and second minimum path metrics; and
   e) integrating differential minimum path metrics successively produced by step (d) and controlling said variable frequency oscillator with the integrated path metrics.

16. A clock recovery method as claimed in claim 15, wherein said predetermined phase is 90 degrees.

17. A clock recovery method as claimed in claim 15, wherein said input data sequence is in a partial response signaling format.

18. A clock recovery method comprising the steps of:
   a) sampling an input data sequence in response to clock pulses produced by a variable frequency oscillator and producing therefrom data samples;
   b) producing from said data samples a plurality of branch metrics respectively representing errors of said data samples from reference levels which said input data sequence assumes when the clock pulses are either advanced or delayed by a predetermined phase from optimum timing of the input data sequence;
   c) producing a first minimum path metric representing a minimum sum of branch metrics which occur in a first sequence and a second minimum path metric representing a minimum sum of branch metrics which occur in a second sequence;

d) producing a differential minimum path metric representing the difference between said first and second minimum path metrics; and e) integrating differential minimum path metrics successively produced by step (d) and controlling said variable frequency oscillator with the integrated path metrics;

and further wherein the step (c) comprises the steps of:

producing from said branch metrics a first plurality of path metrics corresponding respectively to transition phase states which said branch metrics assume when the clock pulses are advanced by said predetermined phase, and producing a second plurality of path metrics corresponding respectively to transition phase states which said branch metrics assume when the clock pulses are delayed by said predetermined phase; and selecting said first minimum path metric from the first plurality of said path metrics, and selecting said second minimum path metric from the second plurality of said path metrics.

19. A clock recovery method comprising the steps of:

a) sampling an input data sequence in response to clock pulses produced by a variable frequency oscillator and producing therefrom data samples;

b) producing from said data samples a plurality of branch metrics respectively representing errors of said data samples from reference levels which said input data sequence assumes when the clock pulses are either advanced or delayed by a predetermined phase from optimum timing of the input data sequence;

c) producing a first minimum path metric representing a minimum sum of branch metrics which occur in a first sequence and a second minimum path metric representing a minimum sum of branch metrics which occur in a second sequence;

d) producing a differential minimum path metric representing the difference between said first and second minimum path metrics; and e) integrating differential minimum path metrics successively produced by step (d) and controlling said variable frequency oscillator with the integrated path metrics;

and further comprising the step of adding an offset value to said differential path metric for compensating for a non-linear characteristic of said input data sequence.

20. A clock recovery method comprising the steps of:

a) sampling an input data sequence in response to clock pulses produced by a variable frequency oscillator and producing therefrom data samples;

b) producing from said data samples a plurality of branch metrics respsectively representing errors of said data samples from reference levels which said input data sequence assumes when the clock pulses are either advanced or delayed by a predetermined phase from optimum timing of the input data sequence;

c) producing a first minimum path metric representing a minimum sum of branch metrics which occur in a first sequence and a second minimum path metric representing a minimum sum of branch metrics which occur in a second sequence;

d) producing a differential minimum path metric representing the difference between said first and second minimum path metrics; and e) integrating differential minimum path metrics successively produced by step (d) and controlling said variable frequency oscillator with the integrated path metrics;

and further wherein the step (a) further comprises the steps of:

storing the data samples in a first shift register; and simultaneously storing the data samples from the first shift register into a second shift register and sequentially reading the data samples from the second shift register at a rate higher than a rate at which said data samples are produced.

* * * * *

UNITED STATES PATENT AND TRADEMARK OFFICE
CERTIFICATE OF CORRECTION

PATENT NO. : 5,991,914
DATED : November 23, 1999
INVENTOR(S) : HONMA, Hiromi

It is certified that error(s) appear in the above-identified patent and that said Letters Patent is hereby corrected as shown below:

On the title page, should read

-- Item [30], Foreign Application Priority Data  Feb. 15, 1996 [JP] Japan 8-027591 --.

Signed and Sealed this

Thirtieth Day of May, 2000

Attest:

Q. TODD DICKINSON

*Attesting Officer*       *Director of Patents and Trademarks*